United States Patent [19]

Stark

[11] Patent Number: 4,784,069

[45] Date of Patent: Nov. 15, 1988

[54] CHEMICAL PROCESS FIRED HEATERS, FURNACES OR BOILERS

[75] Inventor: David C. Stark, Tokers Green, near Reading, England

[73] Assignee: Foster Wheeler USA Corporation, Clinton, N.J.

[21] Appl. No.: 923,513

[22] Filed: Oct. 27, 1986

[30] Foreign Application Priority Data

Nov. 1, 1985 [GB] United Kingdom ............... 8526978

[51] Int. Cl.$^4$ .................. F23J 15/00; F02C 7/08
[52] U.S. Cl. ................... 110/211; 60/39.5; 110/212; 432/72
[58] Field of Search ............ 110/203, 205, 210, 211, 110/212, 254; 60/39.5, 39.7

[56] References Cited

U.S. PATENT DOCUMENTS

| | | | |
|---|---|---|---|
| 2,461,186 | 2/1949 | Seippel | 60/39.5 |
| 2,705,865 | 4/1955 | Mann | 60/39.15 |
| 2,781,635 | 2/1957 | Brogdon | 60/39.5 |
| 3,680,500 | 8/1972 | Pryor | 110/212 |
| 3,727,564 | 4/1973 | Anderson et al. | 110/212 |
| 3,736,886 | 6/1973 | Merigat | 110/254 |
| 3,766,866 | 10/1973 | Krumm | 110/212 |
| 3,807,321 | 4/1974 | Stockman | 110/212 |
| 3,807,322 | 4/1974 | Liu et al. | 110/212 |
| 3,848,548 | 11/1974 | Bolejack | 110/212 |
| 3,861,334 | 1/1975 | Stockman | 110/212 |
| 3,917,444 | 11/1975 | Carthew | 432/72 |
| 4,131,432 | 12/1978 | Sato et al. | 60/39.5 |
| 4,400,352 | 8/1983 | Rehnberg et al. | 60/39.5 |
| 4,475,472 | 10/1984 | Adrian | 110/211 |

Primary Examiner—Henry C. Yuen
Attorney, Agent, or Firm—Marvin A. Naigur; Martin Smolowitz

[57] ABSTRACT

In a chemical process plant or the like, of the type having a gas turbine driven compressor and a fired heater for heating the process medium, and of the type which hitherto used the exhaust (GTE) of one or more gas turbines as an oxidizing medium input for oxidizing the fuel in the radiant section of the fired heater, the GTE is instead now diverted from the radiant section to a heat exchanger and air at substantially atmospheric pressure and ambient temperature is forced through the heat exchanger by a fan so as to be heated by the heat energy derived from the GTE and is then fed to the said oxidizing medium input of the heater radiant section. The GTE which has passed through the heat exchanger is exhausted to atmosphere. Air and any GTE which is surplus to the requirements of the heater radiant section can be fed to a heat recovery convection section in the flue of the heater where it can support further combustion, thereby increasing flexibility of heat recovery in the convection section and in the overall operation of the fired heater.

6 Claims, 2 Drawing Sheets

CHEMICAL PROCESS FIRED HEATERS, FURNACES OR BOILERS

This invention relates to improved arrangements and chemical process fired heaters, furnaces or boilers and to methods of operation thereof.

In certain types of chemical process-plants gas or oil-fired heaters, furnaces or boilers having a radiant section, the heater fuel consumption is a function of the radiant section duty and the temperature of the flue gas as it leaves the radiant section is predetermined by the process, usually at some fixed value. To achieve a reasonable overall efficiency, such plant usually incorporates a heat recovery convection section in which the fluid gas leaving the heater radiant section is used to pre-heat the process fluid which is to be supplied to the radiant section and to provide heat for the purposes of heating other process coils, for generating and super-heating steam and for heating steam generator feedwater coils. Such plants as are here referred to conventionally use gas turbines to drive compressors and it is also a fairly common practice to utilize the gas turbine exhaust (GTE) as the source of oxygen for the combustion of the fuel in the radiant section, i.e. as the oxidizing medium input thereto. Because GTE has typically an exhaust temperature of between 450° C. to 550° C., by feeding GTE into the radiant section the fuel requirement of the heater is reduced as compared with only using fresh air, even though the GTE contains only approximately 15 percent oxygen by weight compared with approximately 23 percent by weight for ambient air so that the quantity of GTE required per unit input of fuel is greater than the quantity of fresh air alone required per unit input of fuel. Despite this increase the overall effect of utilizing GTE is to reduce the fuel consumption in the radiant section. Any GTE which is surplus to that required in the radiant section can be used as an oxygen source for auxiliary firing within the convection heater banks, or it can be dumped into the convection banks so that its sensible heat can be recovered.

SUMMARY OF THE INVENTION

It is one object of the present invention to minimise fuel consumption in a chemical process and plant generally as described above by utilizing the GTE in a manner which is more efficient than has been previously practised. It is also an object of the present invention to provide such plant modified in such a manner that in operation there is a substantial saving of fuel costs compared with previous practices. It is yet a further object of the invention to provide an increase in heat recovery flexibility for the plant.

These objects are achieved in accordance with the present invention by diverting the GTE from the heater input to at least one heat exchanger and by supplying the oxygen requirement of the heater in the form of air which has passed through the at least one heat exchanger, said air being supplied to the heat exchanger as fresh air substantially at atmospheric pressure and ambient temperature by means of a forced draught or induced draught means. The GTE utilized in this manner which has passed through the heat exchanger is exhausted to atmosphere via an exhaust stack or, if so required, is utilized in some other manner. Any GTE which is surplus to the requirement of the heat exchanger is also exhausted directly to atmosphere or utilized as required in the heat recovery convection section or in other processes. Thus in the plant according to the invention there is provided a heat exchanger which on one side receives an input flow of air at substantially atmospheric pressure and ambient temperature and provides a supply of heated air to the normal oxidizing medium input of said heater radiant section, and which heat exchanger on the other side receives an input in the form of exhaust gas from a gas turbine and outputs the exhaust gas after it has given up sensible heat to the air flow to an exhaust means. It is to be understood that in the context of this statement the expression "radiant section" embraces heaters, furnaces and boilers used to implement chemical processes or to heat a medium used in such a process.

When some or all of the GTE leaving the gas turbine is passed through a heat exchanger and used to heat fresh air which is then used by the radiant section burners, the fuel consumption of the heater can be further reduced compared with the use of GTE as described in prior processes. The fresh air can be heated to a temperature below that of the GTE, and such temperature which may be approximately 50° C. less than the GTE inlet temperature to the heat exchanger would depend on the investment criteria of the operator, who would need to balance the capital invested in the heat exchanger against the reduction in the running costs due to fuel savings. A temperature close to, say, 10° C. lower than the GTE temperature would require a high investment in the heat exchanger with consequent high fuel savings, whereas a temperature difference between the heated fresh air and the GTE of, say, 200° C. would lower investment cost but could not maximise fuel savings.

If surplus GTE is available a larger quantity of fresh air than that required in the radiant section can be heated in the heat exchanger and then used as an oxygen source for auxiliary burners within the convection banks. Surplus GTE can also be used directly as an oxygen source for auxiliary firing within the convection banks or it can be dumped into the convection banks so that its sensible heat can be recovered.

The effect of this use of surplus GTE, in addition to reducing fuel consumption, is to increase the flexibility of heat recovery in the convection sections; i.e. the range of heat recovery duties, while still achieving a low flue gas exit temperature from the convection section, is greatly extended compared with the prior systems. Minimum heat recovery occurs when GTE surplus to that required for heating fresh air for the radiant section is dumped into the heat recovery convection sections, at a point appropriate to its temperature level, without any auxiliary firing. Maximum heat recovery would occur when either all the GTE flows through the hear exchanger and the fresh air surplus to that required in the radiant section is used as a source of oxygen for auxiliary firing within the heat recovery convection sections or when only some of the surplus GTE is passed through the heat exchanger to heat fresh air for auxiliary firing in the convection sections with the remainder of the GTE dumped into the heat recovery convection sections at a point appropriate to its temperature level.

Any GTE surplus to that required in the heat exchanger, for heating fresh air, can be dumped direct to atmosphere or into any other heater convection section of the plant.

BRIEF DESCRIPTION OF DRAWINGS

Hereinafter the invention is described by reference to a conventional plant and by way of example with reference to a modification of the conventional plant is illustrate in the accompanying drawings, wherein.

DESCRIPTION OF INVENTION

Figure 1:
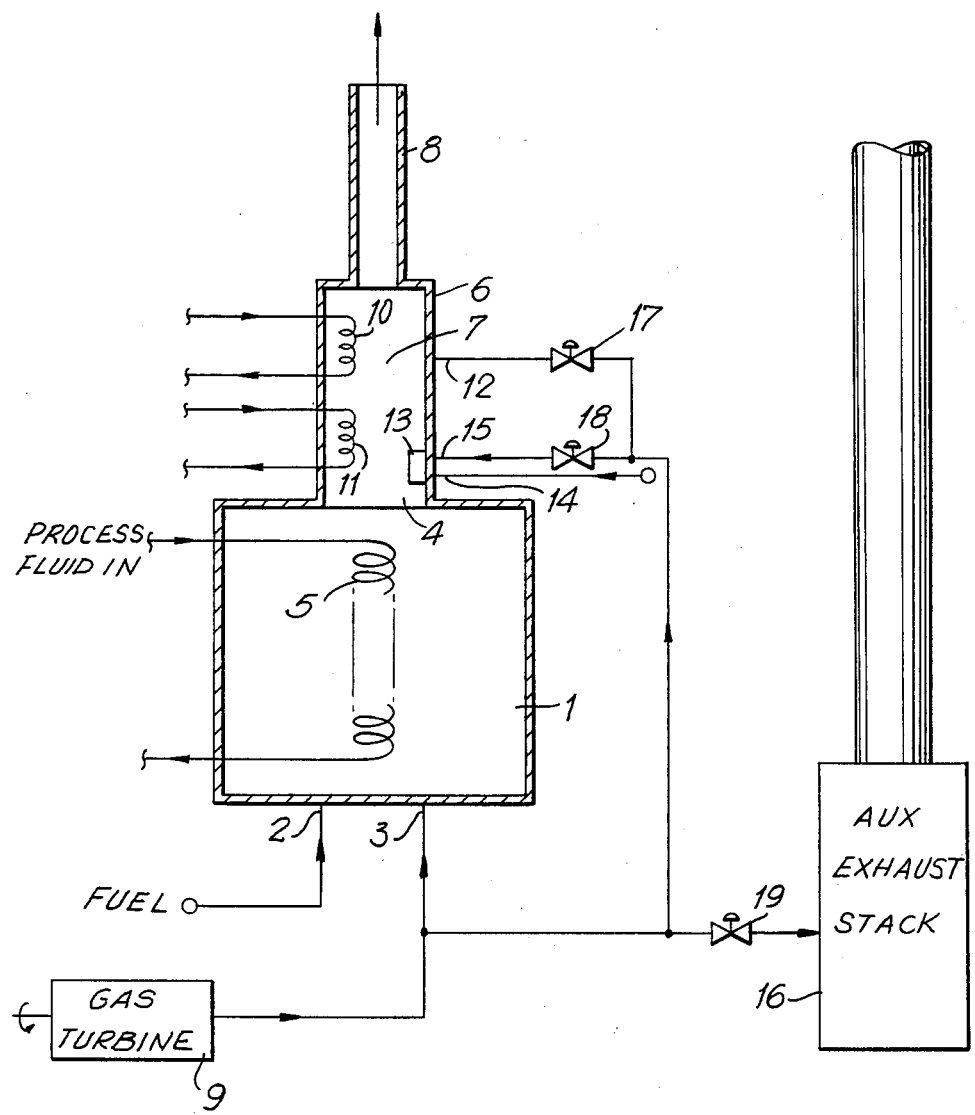
FIG. 1 illustrates a conventional plant commonly in use prior to this invention.

In FIG. 1 a conventional chemical process plant, used for example for cracking the hydrocarbons in a gas/-steam mixture, has a heater comprising a radiant section chamber 1, a fuel input 2, an oxidizing medium input 3 and an exhaust gas output 4. The fuel is burnt within the radiant section chamber 1 using gas turbine exhaust (GTE) as the oxidizing medium in such a manner as to maintain the temperature of the exhaust gas as it leaves the chamber at outlet 4 at a constant value. The process fluid is fed into a coil 5 at the top of the chamber and leaves the coil 5 at the bottom of the chamber. A flue 6 includes a heat recovery convection section 7 and an exhaust stack 8. Inlet 3 receives its input from the exhaust of gas turbine 9 whose main function is to drive a compressor (not shown).

The heat recovery convection section 7 in flue 6, which enables heat energy to be recovered from the flue gas before it is exhausted into the exhaust stack 8, comprises coils 10 and 11 containing heat recovery fluids (other coils may be incorporated to suit the requirements of the plant), a gas turbine exhaust input 12 and an auxiliary burner 13. The latter has a fuel input 14 and a gas turbine exhaust input 15. Inputs 12 and 15 are coupled via respective bypass ducts to the exhaust of the gas turbine 9 which is also connected by a further bypass duct to an auxiliary exhaust stack 16. Controllable valves 17, 18 and 19 in the bypass ducts connected to the inputs 12 and 15 and to the auxiliary exhaust stack 16 are set by the operator, or by him indirectly through a controller, so as to control the flow of surplus GTE in the plant. Any exhaust from the gas turbine 9 which is in excess of the requirement of the process radiant may be fed to the burner 13 or fed directly to the flue 7 so that its heat energy is also recovered in the convection banks of the heat recovery convection section 7, or it may be exhausted directly to atmosphere via the auxiliary exhaust stack 16.

Figure 2:
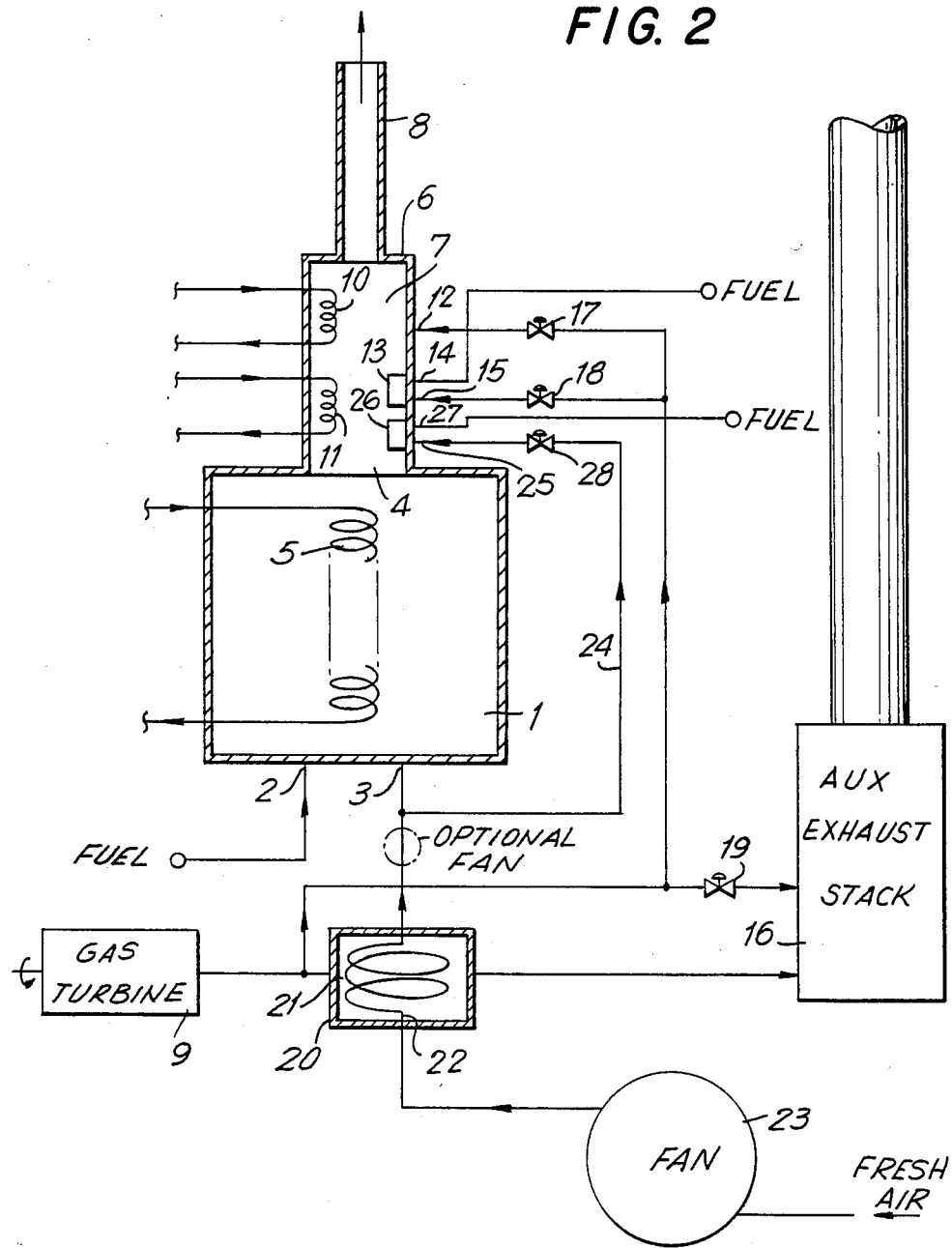
FIG. 2 illustrates a modification to the conventional plant to provide an improved process and plant according to this invention.

In the improved arrangement of FIG. 2, in which common reference numbers have been used for equivalent elements, a two-channel heat exchanger 20 has its input-heat channel 21 connected to the exhaust of the gas turbine 9 and its output-heat channel 22 coupled to a supply of fresh air via a forced draught fan 23. After passing through the heat exchanger 20, the GTE is exhausted to atmosphere in an auxiliary exhaust stack 16. The fresh air in channel 22, now heated and remaining substantially at atmospheric pressure, is fed to the oxidizing medium input 3 of the radiant section chamber 1. Any GTE surplus to the requirement of the heat exchanger 20 is treated in the same way as the surplus GTE in the prior art arrangement. Any heated air which is surplus to the requirements of combustion in the radiant section chamber 1 is fed by duct 24 to the oxidizing medium input 25 of a further burner 26 having a fuel input 27. A controllable valve 28 in duct 24 is set by the plant operator, or indirectly by him through a controller, together with the valves 17, 18 and 19 in accordance with his operating criteria. By using air heated by the GTE to burn the fuel in the radiant section instead of directly using the GTE to burn the fuel a saving of fuel results during the operation of the plant.

The use of the heat exchanger 20, in addition to providing the above-mentioned fuel saving, also provides enhanced flexibility of plant operation by virtue of the added heat recovery facility, provided in the heat recovery convection section 7, comprising the burner 26 and the heated air supplied through duct 24 and controllable valve 28. By these means the operator may set up and control his plant for optimum performance with minimum fuel cost. The coils 10 and 11 can be used, as required, to preheat the process medium or mediums, to preheat boiler feedwater or to generate process steam, etc.

Various additional modifications may be made to the plant of FIG. 2, for example by adding heat recovery coils 10 and 11 in the heat recovery convection section, or by using the GTE leaving the heat exchanger in yet further heating or heat recovery processes. Moreover, an induced draught fan (not shown) may be used instead of the forced draught fan 23, or in addition to it, and be positioned between the air outlet of the heat exchanger 20 and the inlet 3 of the radiant section. All such modifications should be considered as lying within the scope of the appended claims.

I claim:

1. A chemical process plant incorporating a gas turbine, means for utilising the sensible heat of the gas turbine exhaust (GTE) and a fuel-fired heater including a radiant heating section, fuel being burnt in said radiant section for the purpose of heating therein process-fluid contained in a least one process coil, a heat recovery section being provided in the flue of the heater and containing one or more coils containing heat recovery fluids, wherein the improvement comprises a two-channel heat exchanger (20) having a first channel (21) connected between the gas turbine exhaust (9) and an auxiliary gas exhaust means and having a second channel (22) of the heat exchanger connected between a source of fresh air and the fuel-oxidizing medium input (3) of the radiant section of the heater, said heat exchanger (20) thereby supplying heated fresh air to said radiant section at substantially atmospheric pressure, and including a first burner (26) in said flue (6) and a bypass duct (24) connected between the output of the second channel of the heat exchanger and the first burner (26) for conveying surplus heated air from the heat exchange (20) to the first burner (26) for the purposes of supporting combustion therein, said first burner having a further duel supply, (27) and including controllable valve means (28) in said bypass duct for controlling the flow of fluid therein.

2. A chemical process plant according to claim 1, including a bypass duct connected between said gas turbine exhaust and said heat recovery section for conveying surplus (GTE) to the latter, and wherein said bypass duct between the gas turbine exhaust and the heat recovery section is coupled to a second burner (13) situated in the flue (6) of the heater for supporting combustion in said burner, said burner having a fuel supply (14) and including controllable valve means (28) in said bypass duct (24) for controlling the flow of fluid therein.

3. A chemical process plant according to claim 1 wherein said bypass duct between the gas turbine exhaust and heat recovery section has a branch coupled to the flue for bypassing said second burner and dumping GTE directly into the flue, said branch including a controllable means.

4. A chemical process plant according to claim 1 wherein said source of fresh air includes a forced draught fan for forcing fresh air into the heat exchanger at substantially atmospheric pressure.

5. A chemical process plant according to claim 1 including an induced draught fan situated between the fuel-oxidizing medium input of the radiant section and the heat exchanger.

6. a chemical process plant coupled to a gas turbine exhaust (GTE) the plant comprising a radiant heating chamber (1) with feed means for feeding ambient air to the chamber air input (3) at substantially atmospheric pressure; fuel (2) and air inputs(3) to said radiant heating chamber; a heat exchanger (20) flow connected to said radiant heating chamber for preheating the air fed to the chamber air input (3), which heat exchanger (20) derives heat from exhaust gases of the gas turbine; and an exhaust gas outlet (4) from the radiant heating chamber (1) leading to a flue (6) having a heat recovery section (7) therein, said flue (6) further including an auxilliary burner (26) having a fuel input (27) and an air input (25), the air input receiving preheated air from said heat exchanger (20); and valve means (26, 28) for controlling the proportion of preheated air fed to the auxilliary burner; wherein said flue (6) includes an additional input (12) for the exhaust gases from the gas turbine, said additional input receiving the exhaust gases from a duct carrying such gases to the heat exchanger, and including valve means (17) for controlling the proportion of said exhaust gases fed to said additional input.

* * * * *